United States Patent
Im et al.

(10) Patent No.: US 12,130,697 B2
(45) Date of Patent: Oct. 29, 2024

(54) METHOD AND APPARATUS OF MONITORING CONDITION AND CALCULATING REMAINING LIFE OF CENTRAL PROCESSING UNIT FOR TRANSPORTATION DEVICE

(71) Applicant: GLOBIZ CO., LTD., Seoul (KR)

(72) Inventors: Jun Sik Im, Seoul (KR); Dongsu Lee, Busan (KR); Jong Soon Im, Seoul (KR)

(73) Assignee: GLOBIZ CO., LTD., Seoul (KR)

(*) Notice: Subject to any disclaimer, the term of this patent is extended or adjusted under 35 U.S.C. 154(b) by 75 days.

(21) Appl. No.: 18/090,699

(22) Filed: Dec. 29, 2022

(65) Prior Publication Data
US 2023/0244562 A1    Aug. 3, 2023

(30) Foreign Application Priority Data

Jan. 11, 2022   (KR) ........................ 10-2022-0003957

(51) Int. Cl.
| | | |
|---|---|---|
| G06F 11/30 | (2006.01) | |
| G06F 1/04 | (2006.01) | |
| G06F 11/07 | (2006.01) | |
| G06F 11/22 | (2006.01) | |

(52) U.S. Cl.
CPC .............. *G06F 11/079* (2013.01); *G06F 1/04* (2013.01); *G06F 11/0721* (2013.01); *G06F 11/3024* (2013.01); *G06F 11/0739* (2013.01); *G06F 11/2236* (2013.01)

(58) Field of Classification Search
CPC ............. G06F 11/0721; G06F 11/0739; G06F 11/2236; G06F 11/3024; G06F 11/079

USPC .................................................... 714/47.3, 10
See application file for complete search history.

(56) References Cited

U.S. PATENT DOCUMENTS

| | | | | |
|---|---|---|---|---|
| 2009/0287909 | A1* | 11/2009 | Vera ...................... | G06F 11/008 702/186 |
| 2011/0265090 | A1* | 10/2011 | Moyer ................... | G06F 1/3203 707/812 |
| 2012/0036398 | A1* | 2/2012 | Moyer .................... | G06F 9/505 714/48 |
| 2016/0266819 | A1* | 9/2016 | Sundell .................. | G06F 11/008 |
| 2017/0220384 | A1* | 8/2017 | Anderson .............. | G06F 9/4893 |
| 2018/0067535 | A1* | 3/2018 | Kosonocky ......... | G01R 31/2856 |

\* cited by examiner

*Primary Examiner* — Chae M Ko
(74) *Attorney, Agent, or Firm* — LEX IP MEISTER, PLLC

(57) ABSTRACT

A method of diagnosing a condition of a central processing unit (CPU) of a transportation device and calculating a remaining life is disclosed. The method includes detecting, by a controller, data including condition values; comparing, by the controller, the number of previously accumulated condition values with a set number of condition values; constructing, by the controller, a database in response to a determination that the number of previously accumulated condition values is smaller than the set number of condition values; and diagnosing, by the controller, a condition of the CPU in response to a determination that the number of previously accumulated condition values is greater than or equal to the set number of condition values.

A system including the controller configured to execute the above method is further disclosed.

20 Claims, 7 Drawing Sheets

METHOD AND APPARATUS OF MONITORING CONDITION AND CALCULATING REMAINING LIFE OF CENTRAL PROCESSING UNIT FOR TRANSPORTATION DEVICE

CROSS-REFERENCE TO RELATED APPLICATION

This application claims priority to and the benefit of Korean Patent Application No. 10-2022-0003957 filed in the Korean Intellectual Property Office on Jan. 11, 2022, the entire contents of which are incorporated herein by reference.

BACKGROUND OF THE INVENTION

(a) Field of the Invention

The present invention relates to a method and apparatus of monitoring a condition and calculating a remaining life of a central processing unit (CPU) for a transportation device, and more particularly, to a method and apparatus of analyzing a condition of a CPU by analyzing an input value and/or an output value of the CPU for a transportation device and calculating a remaining life.

(b) Description of the Related Art

In order to increase the safety and availability of systems and reduce maintenance costs in transportation devices such as automobiles and railroad cars, condition-based maintenance (CBM) technology has been widely applied worldwide. Currently, a reliability-based maintenance method, which is performed at regular intervals, may perform excessive maintenance, such as maintenance even if there is no failure, or it may be difficult to deal with failures that occur early due to quality dispersion.

Meanwhile, the CBM technology may diagnose defects early and predict a remaining life by mounting sensors in major systems and monitoring conditions of the major systems. Through this predictive maintenance technology, accidents of operating equipment may be prevented and loss costs due to unexpected failures may be reduced.

Recently, as the proportion of electric devices in transportation devices has rapidly increased, the use of a controller, particularly a CPU, for controlling operations of the electric devices has also increased rapidly. Electrical devices may include electrical devices related to safety, such as braking and traction, and electrical devices for occupant convenience, such as cooling, heating, and doors. Two CPUs are used in each safety-related electrical device, and when one CPU fails, the other CPU operates to prepare for safety accidents. In addition, at least one CPU is used for each electric device for occupant convenience.

In this manner, the use of CPUs to control the operation of increasing electric devices has increased, but predictive technology that may predict a lifespan due to deterioration by monitoring a condition of the CPUs and performing preemptively repair before failures occur has yet to be developed.

The above information disclosed in this Background section is only for enhancement of understanding of the background of the invention, and therefore it may contain information that does not form the prior art that is already known in this country to a person of ordinary skill in the art.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a method and apparatus of periodically monitoring input values and/or output values of a central processing unit (CPU) used in a transportation device to analyze a condition of the CPU and calculate a remaining life of the CPU.

According to an exemplary embodiment of the present invention, a method of diagnosing a condition of a central processing unit (CPU) for a transportation device and calculating a remaining life includes: detecting, by a controller, data including condition values; comparing, by the controller, the number of previously accumulated condition values with a set number of condition values; constructing, by the controller, a database in response to a determination that the number of previously accumulated condition values is smaller than the set number of condition values; and diagnosing, by the controller, a condition of the CPU in response to a determination that the number of previously accumulated condition values is greater than or equal to the set number of condition values.

The constructing of the database may include: accumulating a currently measured condition value; calculating an index by processing the currently measured condition value; and calculating first and second reference indices by processing the index.

The condition value may be an input voltage of the CPU, a core processor input voltage, a communication clock signal, or a digital clock signal, the input voltage of the CPU, the core processor input voltage, and the communication clock signal may be output through a communication port, and the digital clock signal is output through a digital I/O port, a condition of the CPU may be diagnosed based on a condition value having a higher priority among available condition values, and the digital clock signal output through the digital I/O port may have a highest priority.

The input voltage of the CPU and the input voltage of the core processor may have the same priority, and the communication clock signal may have a higher priority than the input voltage of the CPU and the core processor input voltage.

The input voltage of the CPU, the core processor input voltage, and the communication clock signal may have the same priority.

The index may be defined as a value obtained by subtracting a set condition value from a currently detected condition value, the first reference index may be calculated by adding a first set value to a maximum value of the accumulated index, the second reference index may be calculated by subtracting the second set value from the minimum value of accumulated indices, the first and second reference indices may include first and second reference indices for a attention level, first and second reference indices for a warning level, and first and second reference indices for an alarm level, the first reference index for the attention level may be smaller than the first reference index for the warning level, the first reference index for the warning level may be smaller than the first reference index for the alarm level, and the second reference index for the attention level may be greater than the second reference index for the warning level, and the second reference index for the warning level may be greater than the second reference index for the alarm level.

The diagnosing of the condition of the CPU may include: comparing an index according to a currently measured condition value with first and second reference indices for an attention level; comparing the index with the first and second reference indices for the warning level in response to a determination that the index is greater than the first reference index for the attention level or smaller than the second reference index for the attention level; comparing the index with the first and second reference indices for the alarm level in response to a determination that the index is greater than the first reference index for the warning level or smaller than the second reference index for the warning level; and determining that the condition of the CPU is the alert level and outputting the condition of the CPU to an output device, in response to a determination that the index is greater than the first reference index for the warning level or smaller than the second reference index for the warning level.

The diagnosing of the condition of the CPU may further include determining that a condition of the CPU is normal in response to a determination that the index is between the first reference index for the attention level and the second reference index for the attention level, and outputting the state of the CPU.

The diagnosing of the condition of the CPU may further include determining that the condition of the CPU is the attention level in response to a determination that the index is greater than the first reference index for the attention level or smaller than the second reference index for the attention level and is between the first reference index for the warning level and the second reference index for the warning level, outputting the condition of the CPU.

The diagnosing of the condition of the CPU may further include: determining that the condition of the CPU is the attention level in response to a determination that the index is greater than the first reference index for the warning level or smaller than the second reference index for the warning level and is between the first reference index for the alarm level and the second reference index for the alarm level, and outputting the condition of the CPU.

The diagnosing of the condition of the CPU may further include: calculating a remaining life of the CPU in response to a determination that the index is greater than the first reference index for the attention level or smaller than the second reference index for the attention level.

When a sign of the index is positive, the remaining life of the CPU may be calculated by multiplying a value obtained by subtracting the index from the first index for the alarm level by an absolute value of a rate of change of the index over time.

When the sign of the index is negative, the remaining life of the CPU may be calculated by multiplying a value obtained by subtracting the second index for the alarm level from the index by an absolute value of a rate of change of the index over time.

According to an exemplary embodiment of the present invention, a system of diagnosing a condition of a central processing unit (CPU) for a transportation device and calculating a remaining life includes: a CPU including: an internal regulator operating upon receiving an input voltage and converting the input voltage into a core processor input voltage, a core processor receiving the core processor input voltage from the internal regulator and outputting a clock signal with a set duty, a register in which the core processor input voltage is recorded, a sampler sampling the clock signal output from the core processor into a communication clock signal, an analog-to-digital converter (ADC) digitally converting an input voltage, a communication port receiving the input voltage from the ADC, receiving the core processor input voltage from the register, and receiving the communication clock signal from the sampler and outputting the input voltage, the core processor input voltage and/or the communication clock signal through communication, and a digital input/output (I/O) port outputting the clock signal output from the core processor as a digital clock signal; a controller receiving the input voltage, the core processor input voltage and/or the communication clock signal from the communication port as a condition value, and processing the condition value to calculate a condition and/or a remaining life of the CPU; and an output device receiving the condition and/or remaining life of the CPU from the controller and outputting the received state and/or remaining life of the CPU.

The controller may diagnose a condition of the CPU based on a condition value having a higher priority among available condition values, and the digital clock signal output through the digital I/O port may have the highest priority.

The input voltage of the CPU and the core processor input voltage may have the same priority, and the communication clock signal may have a higher priority than the input voltage of the CPU and the core processor input voltage.

The input voltage of the CPU, the core processor input voltage, and the communication clock signal may have the same priority.

The controller may calculate an index by subtracting a set condition value from a currently detected condition value, calculate a first reference index by adding a first set value to a maximum value of accumulated indices, and calculate a second reference index by subtracting a second set value from a minimum value of the accumulated indices, the first and second reference indices may include the first and second reference indices for the attention level, the first and second reference indices for the warning level, and the first and second reference indices for the alarm level, the first reference index for the attention level may be smaller than the first reference index for the warning level, the first reference index for the warning level may be smaller than the first reference index for the alarm level, and the second reference index for the attention level may be greater than the second reference index for the warning level, and the second reference index for the warning level may be greater than the second reference index for the warning level.

The controller may compare the index according to the currently measured condition value with first and second reference indices for the attention level, compare the index with the first and second reference indices for the warning level when the index is greater than the first reference index for the attention level or smaller than the second reference index for the warning level, compare the index with the first and second reference indices when the index is greater than the first reference index for the warning level or smaller than the second reference index for the warning level, and determine that the condition of the CPU is an alarm level when the index is greater than the first reference index for the warning level or smaller than the second reference index for the warning level.

When the index is between the first reference index for the attention level and the second reference index for the attention level, the controller may determine that the condition of the CPU is normal.

When the index is greater than the first reference index for the attention level or smaller than the second reference index for the attention level and is between the first reference index for the warning level and the second reference index for the warning level, the controller may determine that the condition of the CPU is the attention level.

When the index is greater than the first reference index for the warning level or smaller than the second reference index for the warning level and is between the first reference index for the alarm level and the second reference index for the alarm level, the controller may determine that the condition of the CPU is the warning level.

When the index is greater than the first reference index for the attention level or smaller than the second reference index for the attention level, the controller may calculate a remaining life of the CPU based on the index, the first and second indices for the alarm level, and a rate of change of the index over time.

According to the present invention, system stability and availability may be improved by monitoring a condition of a CPU and predicting a remaining life by using a clock transmitted from the CPU used in a transportation device, an input voltage of the CPU, and/or an input voltage of a core processor of the CPU.

In addition, the effects that may be obtained or predicted according to the exemplary embodiments of the present invention are disclosed directly or implicitly in the detailed description of the exemplary embodiments of the present invention. That is, various effects predicted according to exemplary embodiments of the present invention will be disclosed in the detailed description to be described below.

BRIEF DESCRIPTION OF THE DRAWINGS

Exemplary embodiments herein may be better understood by reference to the following description in connection with the accompanying drawings in which like reference signs refer to identical or functionally similar elements.

Figure 1:
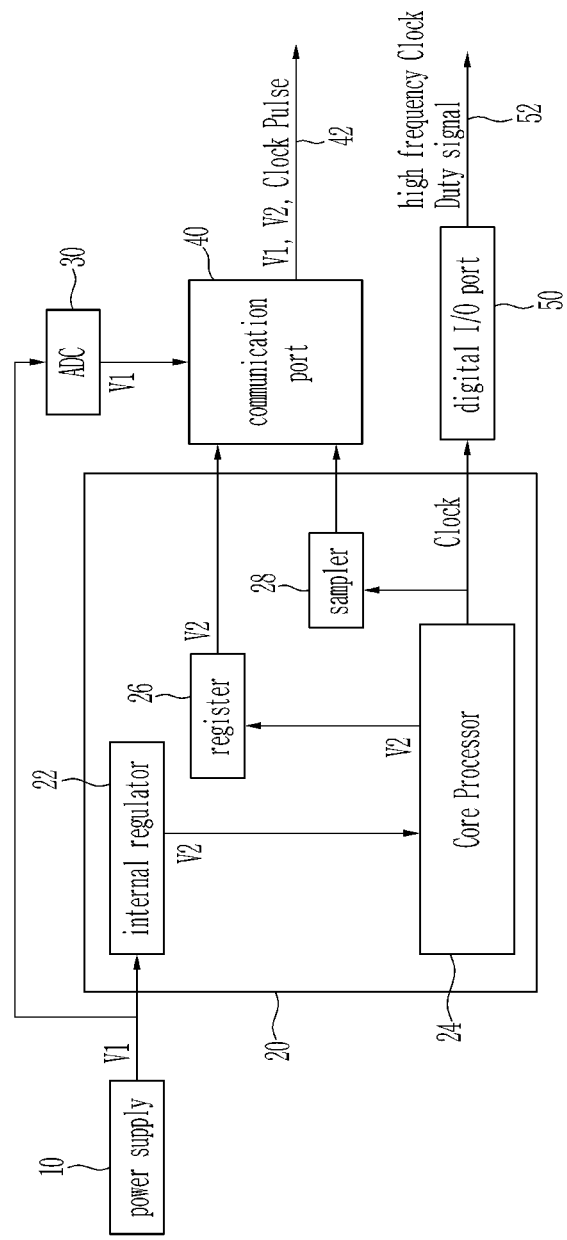
FIG. 1 is a block diagram illustrating a schematic configuration of a central processing unit (CPU) that may be used in a system of diagnosing a condition of the CPU for a transportation device and calculating a remaining life according to an exemplary embodiment of the present invention.

It is to be understood that the drawings referenced above are not necessarily drawn to scale, but rather present a rather simplified representation of various preferred features illustrating the basic principles of the invention. Certain design features of the present invention, including, for example, particular dimensions, orientation, location, and shape, will be determined in part by the particular intended application and environment of use.

DETAILED DESCRIPTION OF THE EXEMPLARY EMBODIMENTS

The terminology used herein is for the purpose of describing specific exemplary embodiments only and is not intended to limit the present invention. As used herein, the singular forms are intended to include the plural forms as well, unless the context clearly indicates otherwise. The terms "comprise" and/or "comprising", when used herein, specify the presence of recited features, integers, levels, operations, components and/or components, but It will also be understood that does not exclude the presence or addition of one or more of the features, integers, levels, acts, elements, components and/or groups thereof As used herein, the term "and/or" includes any one or all combinations of the associated listed items.

Transportation devices include vehicles. As used herein, terms such as "vehicle" or "vehicular" or other similar terms are understood as including cars, buses, trucks, various commercial vehicles, including sport utility vehicles (SUVs), as well as rail vehicles, ships, including various boats and vessels, aircraft, drones, and the like.

Additionally, it is understood that one or more of the methods below or aspects thereof may be executed by at least one control unit (e.g., electronic control unit (ECU), etc.), controller, or control server. The terms "control unit", "controller", or "control server" may refer to a hardware device that includes a memory and a processor. The memory is configured to store program instructions and the processor is specially programmed to execute the program instructions to perform one or more processes described in more detail below. The control unit, controller, or control server, as described herein, may control the operation of units, modules, components, devices, or the like. It is also understood that the methods below may be practiced by an apparatus that includes a control unit or controller along with one or more other components, as recognized by a person skilled in the art.

In addition, the control unit, controller, or control server of the present invention may be implemented as a non-transitory computer-readable recording medium including executable program instructions executed by a processor. Examples of the computer-readable recording medium include ROM, RAM, compact disk, ROM, magnetic tapes, floppy disks, flash drives, smart cards, and optical data storage devices, but are not limited thereto. The computer-readable recording medium may also be distributed throughout a computer network to store and execute program instructions in a distributed manner, such as, for example, a telematics server or a controller area network (CAN).

A method and system of diagnosing a condition of a central processing unit (CPU) for a transportation device and calculating a remaining life according to an exemplary embodiment of the present invention may periodically monitor input values and/or output values of the CPU, analyzes a condition of the CPU, and calculate the remaining life. In addition, the condition of the CPU and a remaining life thereof may be always accurately diagnosed by giving priority to input values and/or output values of the CPU to be monitored.

Hereinafter, exemplary embodiments of the present invention will be described in detail with reference to the accompanying drawings.

FIG. 1 is a block diagram illustrating a schematic configuration of a central processing unit (CPU) that may be used in a system of diagnosing a condition of the CPU for a transportation device and calculating a remaining life according to an exemplary embodiment of the present invention.

As illustrated in FIG. 1, a CPU 20 is configured to control an operation of each of a plurality of units, modules, devices, and components included in a transportation device. In the present specification, an exemplary embodiment of the present invention is applied to a CPU for a transportation device, but the subject to which the exemplary embodiment of the present invention may be applied is not limited to the CPU for a transportation device, and those skilled in the art may understand that the spirit of the present invention is applicable to various CPUs through appropriate changes.

The CPU 20 operates upon receiving an input voltage V1 from an external power supply 10. The CPU 20 includes an internal regulator 22, a core processor 24, a register 26, and a sampler 28.

The internal regulator 22 converts the input voltage V1 input to the CPU 20 into a core processor input voltage V2 for operation of the core processor 24 and applies the core processor input voltage V2 to the core processor 24.

Figure 3:
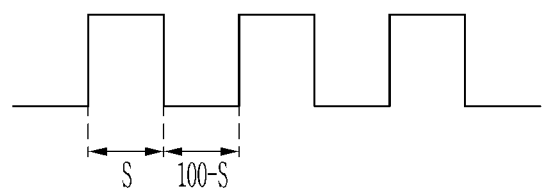
FIG. 3 illustrates a typical clock signal.

The core processor 24 processes an input signal using the core processor input voltage V2 as a use voltage, and outputs a processed signal as a control signal. The core processor 24 records the core processor input voltage V2 in the register 26. In addition, the core processor 24 outputs a clock signal with a set duty S. For example, the duty S refers to a ratio of a period during which '1' is output during one period. As illustrated in FIG. 3, assuming that one cycle is 100, 1 is output during 'S' and 0 is output during '100–S' in the duty S. In this case, the duty is a value between 0 and 100. In general, since the clock signal is of high frequency and thus unsuitable to be transmitted through communication, the sampler 28 samples the clock signal at a sampling frequency suitable for communication.

In order to monitor the condition of the CPU 20, the CPU 20 is configured to output a condition value. Here, the condition value may be the input voltage V1 of the CPU 20, the core processor input voltage V2, and the clock signal having a set duty S. To this end, the CPU 20 further includes an analog-to-digital converter (ADC) 30, a communication port 40, and a digital I/O port 50.

The ADC 30 digitally converts the input voltage V1 of the CPU 20 and transmits the same to the communication port 40.

The communication port 40 receives the input voltage V1 of the CPU 20 from the ADC 30, receives the core processor input voltage V2 from the register 26, and receives the clock signal with the set duty S from the sampler 28. The communication port 40 transmits an input voltage V1 of the CPU 20, the core processor input voltage V2, and/or the clock signal with a set duty S through communication through a communication line 42.

The digital I/O port 50 directly receives the clock signal with the set duty S from the core processor 24 and transmits the clock signal with the set duty S through the digital signal line 52. In addition, an additional sampler (not illustrated) may be provided between the digital I/O port 50 and the core processor 24 to sample a clock signal at a higher sampling frequency than a sampling frequency of the sampler 28 and transmit the sampled clock signal to the digital I/O port 50. Here, in order to distinguish between the clock signal having the set duty S output through the communication line 42 and the clock signal having the set duty S output through the digital signal line 52, the clock signal having the set duty S output through the communication line 42 is referred to as a 'communication clock signal' and the clock signal having the set duty S output through the digital signal line 52 refers to a 'digital clock signal'. A frequency of the digital clock signal is higher than that of the communication clock signal.

Figure 2:
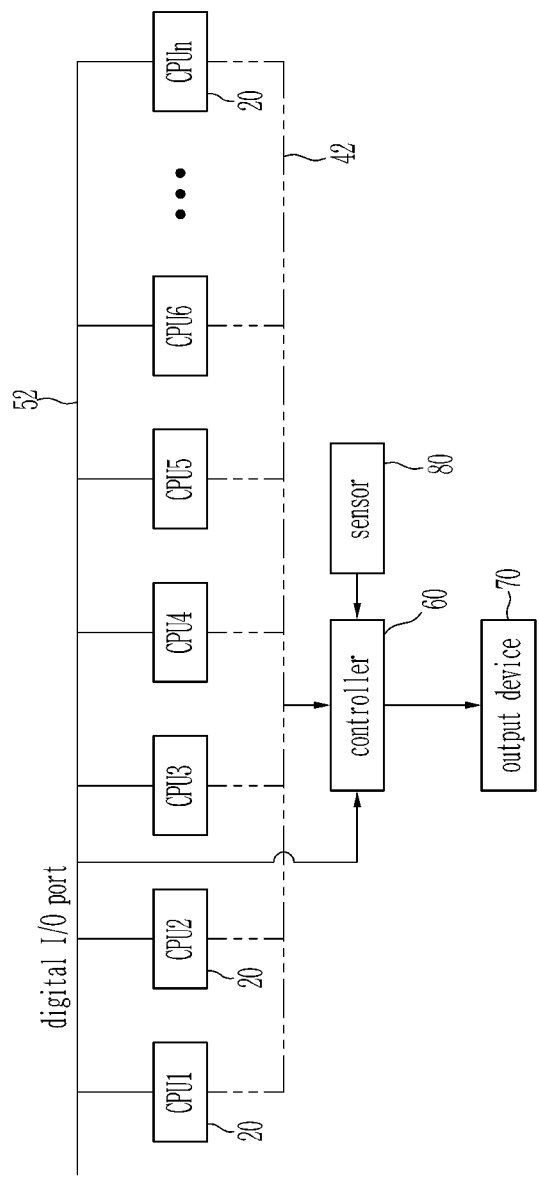
FIG. 2 is a block diagram of a system of diagnosing a condition of a CPU for a transportation device and calculating a remaining life according to an exemplary embodiment of the present invention.

FIG. 2 is a block diagram of a system of diagnosing a condition of a CPU for a transportation device and calculating a remaining life according to an exemplary embodiment of the present invention.

As illustrated in FIG. 2, a system of diagnosing a condition of a CPU for a transportation device and calculating a remaining life according to an exemplary embodiment of the present invention is configured to simultaneously monitor a plurality of CPUs (CPU1, CPU2, CPU3, . . . , CPUn). The system includes the plurality of CPUs (CPU1, CPU2, CPU3, . . . , CPUn) to be monitored, a sensor 80, a controller 60, and an output device 70.

Each of the plurality of CPUs (CPU1, CPU2, CPU3, . . . , CPUn) directly transmits a clock signal (i.e., a digital clock signal) having a set duty S to the controller 60 through the digital signal line 52, and transmits the input voltage V1 of the CPU 20, the core processor input voltage V2 and/or a clock signal (i.e., a communication clock signal) having a set duty S by communication through the communication line 42. As described above, the input voltage V1 of the CPU 20, the core processor input voltage V2, the communication clock signal and/or the digital clock signal are examples of condition values.

The sensor 80 detects a condition variable and transmits the condition variable to the controller 60. Here, the condition variable refers to a variable that may affect the condition value. Condition values of the CPU 20 should maintain the set condition values, but the values may vary under the influence of condition variables. Therefore, the condition value according to the condition variable (more precisely, the index according to the condition variable) is appropriately graphically displayed so that the influence of the condition variable on the condition value may be visible at a glance (refer to FIGS. 5 to 7, for example). For example, the condition variable may be a driving location, a driving speed, and the number of driving times. In addition, in the case of vehicles such as railroad vehicles, airplanes, and buses that repeatedly operate in a set section on a set schedule, the condition variable may be a driving location and the number of driving times.

The controller 60 receives a digital clock signal as a condition value through the digital signal line 52 from each of the plurality of CPUs 20, receives the input voltage V1 of the CPU 20, the core processor input voltage V2 and/or the communication clock signal as condition values through the communication line 42, and receives condition variables such as the driving location and the number of driving times from the sensor 80. The controller 60 calculates the condition and/or remaining life of each CPU 20 based on the condition value, and transmits the same to the output device 70. To this end, the controller 60 may be implemented as one or more processors operated by a set program, and the set program may be programmed to perform each operation of the method of diagnosing the condition of the CPU for a transportation device and calculating a remaining life according to an exemplary embodiment of the present invention.

The controller 60 may determine the condition of each CPU 20 as one of a normal level, an attention level, a warning level, and an alarm level according to a set reference. Here, the alarm level indicates a condition in which the corresponding CPU 20 is completely out of order. Also, when the condition of the CPU 20 is not normal, the controller 60 may calculate a remaining life until entering the alarm level. The controller 60 transmits data indicating the condition and/or remaining life of the CPU 20 to the output device 70.

The output device 70 receives the data indicating the condition and/or remaining life of the CPU 20 from the controller 60, and outputs the condition and/or remaining life of the CPU 20. For example, the output device 70 may be a display, a speaker, or the like.

Figure 4:
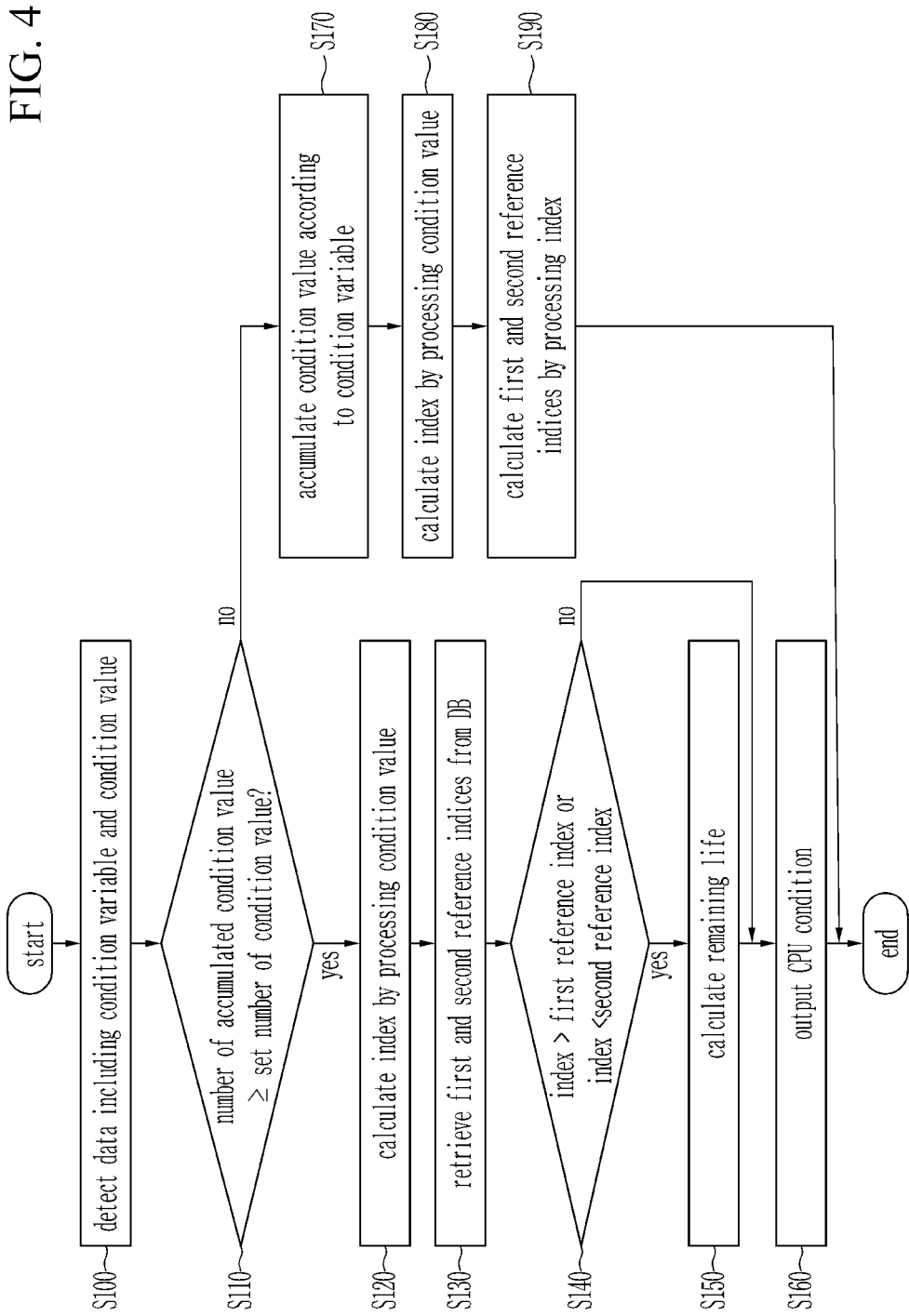
FIG. 4 is a flowchart of a method of diagnosing a condition of a CPU for a transportation device and calculating a remaining life according to an exemplary embodiment of the present invention.

FIG. 4 is a flowchart of a method of diagnosing a condition of a CPU for a transportation device and calculating a remaining life according to an exemplary embodiment of the present invention.

As illustrated in FIG. 4, the method of diagnosing a condition of a CPU for a transportation device and calculating a remaining life according to an exemplary embodiment of the present invention starts from an operation S100. In operation S100, the sensor 80 detects a condition variable and transmits the condition variable to the controller 60, and the controller 60 receives the condition value through the communication line 42 and/or the digital signal line 52. As described above, the condition value may be a digital clock signal, the input voltage V1 of the CPU 20, the core processor input voltage V2, and/or a communication clock signal. In addition, for the accuracy of condition diagnosis, the condition value may be prioritized. In an example, the digital clock signal has the highest priority, the communication clock signal has medium priority, and the input voltage V1 of the CPU 20 and the core processor input voltage V2 have the same priority which is the lowest. In another example, the digital clock signal has the highest priority, and the communication clock signal, the input voltage V1 of the CPU 20 and the core processor input voltage V2 may have the same priority which is the lowest. The controller 60 may monitor the condition of the corresponding CPU 20 using the condition value having a relatively high priority among available condition values and calculate a remaining life. Accordingly, the accuracy of condition diagnosis and calculation of a remaining life may be increased.

When the data including condition variables and condition values is detected, the controller 60 determines whether the number of previously accumulated condition values is greater than or equal to a set number of condition values (S110). If the condition of the corresponding CPU 20 is diagnosed in a state in which the number of accumulated condition values is small, an error may occur. Accordingly, when the number of previously accumulated condition values is smaller than the set number of condition values, the condition of the corresponding CPU 20 is not diagnosed and a database for condition diagnosis is constructed.

More specifically, when the number of previously accumulated condition values is smaller than the set number of condition values, the controller 60 accumulates a currently detected condition value (S170). Also, the controller 60 calculates an index by processing the currently detected condition value (S180). Furthermore, the controller 60 calculates first and second reference indices by processing the index (S190).

The index is defined as a value obtained by subtracting a set condition value from the currently detected condition value.

For example, when the condition value is a digital clock signal or a communication clock signal, the index is calculated by the following equation.

$$Id = Smes - S$$

Here, Id is an index, Smes is a currently detected duty, and S is a set duty. For another example, when the condition value is the input voltage V1 of the CPU 20, the index is calculated by the following equation.

$$Id = V1mes - V1$$

Here, V1mes is the currently detected input voltage of the CPU, and V1 is the set input voltage of the CPU.

For another example, when the condition value is the core processor input voltage V2, the index is calculated by the following equation.

$$Id = V2mes - V2$$

Here, V2mes is the currently detected core processor input voltage, and V2 is the set core processor input voltage.

When the index is calculated, the controller 60 accumulates the calculated index and calculates a maximum value Idmax and a minimum value Idmin of the accumulated indices. In addition, a first reference index is calculated by adding a first set value to the maximum index value Idmax, and calculates a second reference index by subtracting a second set value from the minimum index value Idmin.

Here, the first and second reference indices include first and second indices for the attention level, first and second indices for the warning level, and first and second indices for the alarm level. More specifically, the first reference index for the attention level is calculated by adding a first set value for the attention level to the maximum value Idmax of the index, the first reference index for the warning level is calculated by adding a first set value for the warning level to the maximum value Idmax of the index, and a first reference index for the alarm level may be calculated by adding a first set value for the alarm level to the maximum value Idmax of the index. In addition, the second reference index for the attention level is calculated by subtracting a second set value for the attention level from the minimum value Idmin of the index, the second reference index for the warning level is calculated by subtracting a second set value for the warning level from the minimum value Idmin of the index, and the second reference index for the alert level is calculated by subtracting a second set value for the alert level from the minimum value Idmin of the index. Here, the first and second set values for the attention level, the first and second set values for the warning level, and the first and second set values for the alarm level are positive integers, and the first and second set values for the alarm level are greater than the first and second set values for the warning level, and the first and second set values for the warning level are greater than the first and second set values for the attention level. In other words, the first index for the attention level is smaller than the first index for the warning level, and the first index for the warning level is smaller than the first index for the alarm level. Also, the second index for the attention level is greater than the second index for the warning level, and the second index for the warning level is greater than the second index for the alarm level.

When the index and the first and second reference indices are calculated, the method according to an exemplary embodiment of the present invention is terminated.

Figure 5:
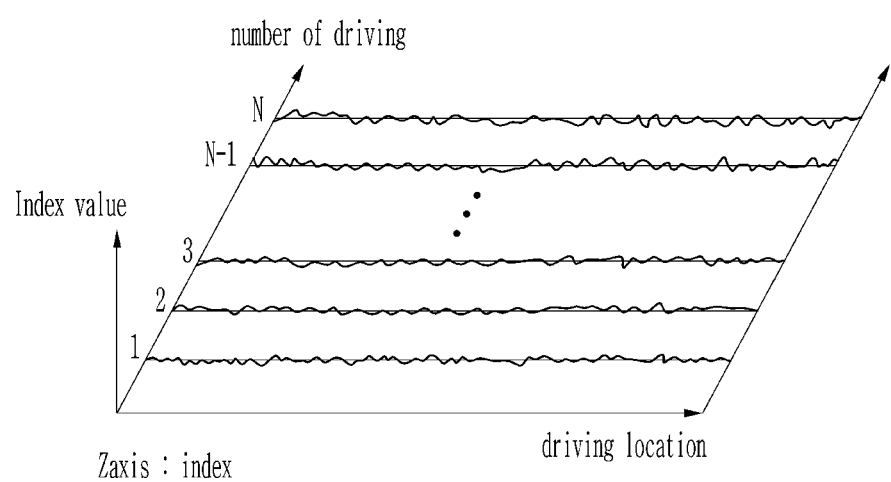
FIG. 5 is a graph illustrating an example of an index according to a driving location and a driving number.
Figure 6:
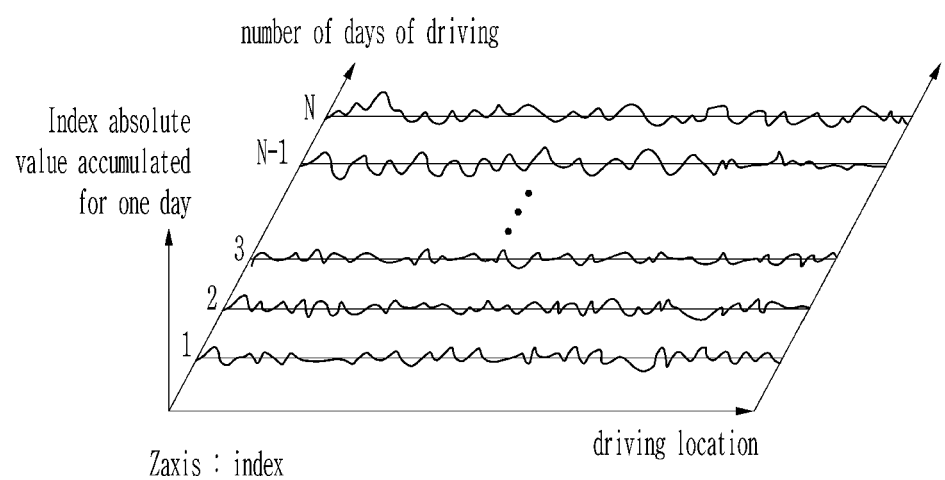
FIG. 6 is a graph illustrating a cumulative index obtained by accumulating the index of FIG. 5 for one day.
Figure 7:
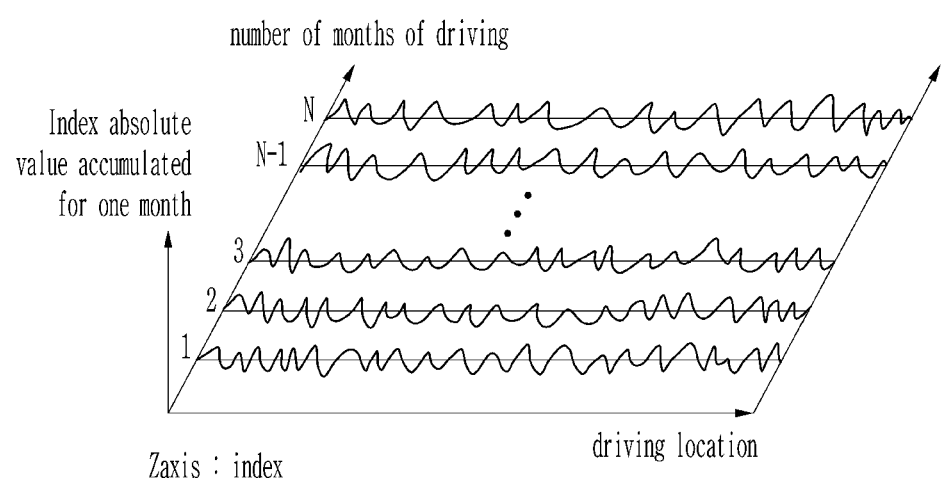
FIG. 7 is a graph illustrating a cumulative index obtained by accumulating the index of FIG. 5 for one month.

Meanwhile, before terminating the method according to the exemplary embodiment of the present invention, the controller 60 may display the index according to the condition variable as a graph, so that users may recognize the influence of the condition variables on the index at a glance, as illustrated in FIGS. 5 to 7. FIGS. 5 to 7 illustrate an index according to a driving location in a railroad vehicle that repeatedly runs in a set section. As illustrated in FIG. 5, when the index according to a driving location and the number of driving is displayed, it may be difficult to recognize a change in the index according to the driving location. However, when the index of FIG. 5 is accumulated for one day as illustrated in FIG. 6 or the index of FIG. 5 is accumulated for one month as illustrated in FIG. 7, changes in the index according to the driving location may be recognized at a glance.

Meanwhile, unlike a case in which a database is built with a small number of condition values, as the use of the CPU 20 increases, the CPU 20 may deteriorate, and condition values of the deteriorated CPU 20 may be outside the initial condition values of the CPU 20. Therefore, if the condition of the CPU 20 is diagnosed using the condition value of the CPU 20 that has been deteriorated to a considerable extent, an error may occur. If the number of previously accumulated condition values is equal to or greater than the set number of condition values in operation S110, the currently detected condition value is not used for database construction, but is used only for condition diagnosis. To this end, the controller 60 calculates the index by processing the condition value (S120). Since operation S120 is performed in the same manner as operation S180, further description is omitted.

When the index is calculated by processing the currently detected condition value in operation S120, the controller 60 retrieves the first and second reference indices from the database constructed through operations S170 to S190 (S130). The first and second reference indices retrieved from the database include the first and second reference indices for the attention level, the first and second reference indices for the warning level, and the first and second reference indices for the alarm level.

The controller 60 compares the calculated index with the first and second indices (S140).

More specifically, the controller 60 determines whether the index is greater than the first reference index for the attention level or smaller than the second reference index for the attention level. If the index is between the first reference index for the attention level and the second reference index for the attention level, the controller 60 determines that the corresponding CPU 20 is at a normal level, and outputs the condition of the CPU 20 through the output device 70 (S160).

If the index is greater than the first reference index for the attention level or smaller than the second reference index for the attention level, the controller 60 determines whether the index is greater than the first reference index for the warning level or smaller than the second reference index for the warning level. If the index is between the first reference index for the warning level and the second reference index for the warning level, the controller 60 determines that the corresponding CPU 20 is at the warning level.

If the index is greater than the first reference index for the warning level or smaller than the second reference index for the warning level, the controller 60 determines whether the index is greater than the first reference index for the alarm level or smaller than the second reference index for the alarm level. If the index is between the first reference index for the alarm level and the second reference index for the alarm level, the controller 60 determines that the CPU 20 is at the warning level.

If the index is larger than the first reference index for the alarm level or smaller than the second reference index for the alarm level, the controller 60 determines that the corresponding CPU 20 is at the alarm level. As described above, when the CPU 20 is at the alarm level, the corresponding CPU 20 is completely out of order, and in this case, the remaining life is zero.

In operation S140, if the corresponding CPU 20 is at the warning level, attention level, the warning level, or the alarm level through comparison between the index and the first and second reference indices, the controller 60 calculates the remaining life of the corresponding CPU 20 based on the index (S150). The remaining life of the corresponding CPU 20 may be calculated from the following equation.

Remaining life=(first index for alarm level-index)
*abs(rate of change of index over time)

Remaining life=(index-second index for alarm level)
*abs(rate of change of index over time)

Here, abs( ) refers to an absolute value, and the rate of a change in the index over time may be calculated using a moving average method, a particle filter method, a hyper function regression method, and the like. In addition, when calculating the remaining life according to the sign of the index, the first index for the alarm level or the second index for the alarm level is used. That is, if the sign of the index is a positive number, the remaining life of the corresponding CPU 20 is calculated using the first index for the alarm level. In contrast, if the sign of the index is a negative number, the remaining life of the corresponding CPU 20 is calculated using the second index for the alarm level.

When the remaining life of the CPU 20 is calculated in operation S150, the controller 60 outputs the condition and remaining life of the corresponding CPU 20 through the output device 70 (S160).

While this invention has been described in connection with what is presently considered to be practical exemplary embodiments, it is to be understood that the invention is not limited to the disclosed exemplary embodiments. On the contrary, it is intended to cover various modifications and equivalent arrangements included within the spirit and scope of the appended claims.

What is claimed is:

1. A method of diagnosing a condition of a central processing unit (CPU) for a transportation device and calculating a remaining life, the method comprising:
   detecting, by a controller, data including condition values;
   comparing, by the controller, a number of previously accumulated condition values with a set number of condition values;
   constructing, by the controller, a database in response to a determination that the number of previously accumulated condition values is smaller than the set number of condition values; and
   diagnosing, by the controller, a condition of the CPU in response to a determination that the number of previously accumulated condition values is greater than or equal to the set number of condition values,
   wherein, the constructing of the database includes:
   accumulating a currently measured condition value;
   calculating an index by processing the currently measured condition value; and
   calculating first and second reference indices by processing the index, and
   the condition value is an input voltage of the CPU, a core processor input voltage, a communication clock signal, or a digital clock signal, the input voltage of the CPU, the core processor input voltage, and the communication clock signal are output through a communication port, and the digital clock signal is output through a digital I/O port, a condition of the CPU is diagnosed based on a condition value having a higher priority among available condition values, and the digital clock signal output through the digital I/O port has a highest priority.

2. The method of claim 1, wherein:

the input voltage of the CPU and the input voltage of the core processor have the same priority, and the communication clock signal has a higher priority than the input voltage of the CPU and the core processor input voltage.

3. The method of claim 1, wherein:

the input voltage of the CPU, the core processor input voltage, and the communication clock signal have the same priority.

4. The method of claim 1, wherein:

the index is defined as a value obtained by subtracting a set condition value from a currently detected condition value, the first reference index is calculated by adding a first set value to a maximum value of the accumulated index, the second reference index is calculated by subtracting a second set value from a minimum value of accumulated indices, the first and second reference indices include first and second reference indices for an attention level, first and second reference indices for a warning level, and first and second reference indices for an alarm level, the first reference index for the attention level is smaller than the first reference index for the warning level, the first reference index for the warning level is smaller than the first reference index for the alarm level, and the second reference index for the attention level is greater than the second reference index for the warning level, and the second reference index for the warning level is greater than the second reference index for the alarm level.

5. The method of claim 4, wherein:

the diagnosing of the condition of the CPU includes:

comparing an index according to a currently measured condition value with first and second reference indices for an attention level;

comparing the index with the first and second reference indices for the warning level in response to a determination that the index is greater than the first reference index for the attention level or smaller than the second reference index for the attention level;

comparing the index with the first and second reference indices for the alarm level in response to a determination that the index is greater than the first reference index for the warning level or smaller than the second reference index for the warning level; and determining that the condition of the CPU is an alert level and outputting the condition of the CPU to an output device, in response to a determination that the index is greater than the first reference index for the warning level or smaller than the second reference index for the warning level.

6. The method of claim 5, wherein:

the diagnosing of the condition of the CPU further includes determining that the condition of the CPU is normal in response to a determination that the index is between the first reference index for the attention level and the second reference index for the attention level, and outputting a state of the CPU.

7. The method of claim 5, wherein:

the diagnosing of the condition of the CPU further includes determining that the condition of the CPU is the attention level in response to a determination that the index is greater than the first reference index for the attention level or smaller than the second reference index for the attention level and is between the first reference index for the warning level and the second reference index for the warning level, outputting the condition of the CPU.

8. The method of claim 5, wherein:

the diagnosing of the condition of the CPU further includes determining that the condition of the CPU is the attention level in response to a determination that the index is greater than the first reference index for the warning level or smaller than the second reference index for the warning level and is between the first reference index for the alarm level and the second reference index for the alarm level, and outputting the condition of the CPU.

9. The method of claim 5, wherein:

the diagnosing of the condition of the CPU further includes calculating a remaining life of the CPU in response to a determination that the index is greater than the first reference index for the attention level or smaller than the second reference index for the attention level.

10. The method of claim 9, wherein:

when a sign of the index is positive, the remaining life of the CPU is calculated by multiplying a value obtained by subtracting the index from a first index for the alarm level by an absolute value of a rate of change of the index over time.

11. The method of claim 9, wherein:

when a sign of the index is negative, the remaining life of the CPU is calculated by multiplying a value obtained by subtracting a second index for the alarm level from the index by an absolute value of a rate of change of the index over time.

12. A system of diagnosing a condition of a central processing unit (CPU) for a transportation device and calculating a remaining life, the system comprising:

a CPU including: an internal regulator operating upon receiving an input voltage and converting the input voltage into a core processor input voltage, a core processor receiving the core processor input voltage from the internal regulator and outputting a clock signal with a set duty, a register in which the core processor input voltage is recorded, a sampler sampling the clock signal output from the core processor into a communication clock signal, an analog-to-digital converter (ADC) digitally converting an input voltage, a communication port receiving the input voltage from the ADC, receiving the core processor input voltage from the register, and receiving the communication clock signal from the sampler and outputting the input voltage, the core processor input voltage and/or the communication clock signal through communication, and a digital input/output (I/O) port outputting the clock signal output from the core processor as a digital clock signal;

a controller receiving the input voltage, the core processor input voltage and/or the communication clock signal from the communication port as a condition value, and processing the condition value to calculate a condition and/or a remaining life of the CPU; and an output device receiving the condition and/or remaining life of the CPU from the controller and outputting the received condition and/or remaining life of the CPU, wherein the controller diagnoses a condition of the CPU based on a condition value having a higher priority among available condition values, and the digital clock signal output through the digital I/O port has a highest priority.

13. The system of claim 12, wherein:
the input voltage of the CPU and the core processor input voltage have the same priority, and
the communication clock signal has a higher priority than the input voltage of the CPU and the core processor input voltage.

14. The system of claim 12, wherein:
the input voltage of the CPU, the core processor input voltage, and the communication clock signal have the same priority.

15. The system of claim 12, wherein:
the controller calculates an index by subtracting a set condition value from a currently detected condition value, calculates a first reference index by adding a first set value to a maximum value of accumulated indices, and calculates a second reference index by subtracting a second set value from a minimum value of the accumulated indices,
the first and second reference indices include the first and second reference indices for an attention level, the first and second reference indices for a warning level, and the first and second reference indices for an alarm level,
the first reference index for the attention level is smaller than the first reference index for the warning level, the first reference index for the warning level is smaller than the first reference index for the alarm level,
the second reference index for the attention level is greater than the second reference index for the warning level, and the second reference index for the warning level is greater than the second reference index for the warning level.

16. The system of claim 15, wherein:
the controller compares the index according to the currently measured condition value with first and second reference indices for the attention level, compares the index with the first and second reference indices for the warning level when the index is greater than the first reference index for the attention level or smaller than the second reference index for the warning level, compares the index with the first and second reference indices when the index is greater than the first reference index for the warning level or smaller than the second reference index for the warning level, and determines that the condition of the CPU is an alarm level when the index is greater than the first reference index for the warning level or smaller than the second reference index for the warning level.

17. The system of claim 16, wherein:
when the index is between the first reference index for the attention level and the second reference index for the attention level, the controller determines that the condition of the CPU is normal.

18. The system of claim 16, wherein:
when the index is greater than the first reference index for the attention level or smaller than the second reference index for the attention level and is between the first reference index for the warning level and the second reference index for the warning level, the controller determines that the condition of the CPU is the attention level.

19. The system of claim 16, wherein:
when the index is greater than the first reference index for the warning level or smaller than the second reference index for the warning level and is between the first reference index for the alarm level and the second reference index for the alarm level, the controller determines that the condition of the CPU is the warning level.

20. The system of claim 16, wherein:
when the index is greater than the first reference index for the attention level or smaller than the second reference index for the attention level, the controller calculates a remaining life of the CPU based on the index, the first and second indices for the alarm level, and a rate of change of the index over time.

* * * * *